US008619964B2

(12) United States Patent
Pisani et al.

(10) Patent No.: US 8,619,964 B2
(45) Date of Patent: Dec. 31, 2013

(54) CONTROLLING A CALL COMPLETION

(75) Inventors: Alfonso Pisani, Scafati (IT); Biagio Maione, Naples (IT); Rogier Noldus, BM Goirle (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 115 days.

(21) Appl. No.: 12/809,935

(22) PCT Filed: Dec. 21, 2007

(86) PCT No.: PCT/EP2007/011375
§ 371 (c)(1),
(2), (4) Date: Aug. 4, 2010

(87) PCT Pub. No.: WO2009/086842
PCT Pub. Date: Jul. 16, 2009

(65) Prior Publication Data
US 2010/0296644 A1    Nov. 25, 2010

(51) Int. Cl.
H04M 3/48      (2006.01)
H04M 7/00      (2006.01)

(52) U.S. Cl.
USPC ............ 379/209.01; 379/207.05; 379/207.08; 379/221.03; 379/221.08; 379/221.09; 379/221.12

(58) Field of Classification Search
USPC ............ 379/201.01, 207.02, 207.05, 207.08, 379/209.01, 210.01, 221.03, 221.08, 379/221.09, 221.12
See application file for complete search history.

(56) References Cited

U.S. PATENT DOCUMENTS

| 5,425,091 A | 6/1995 | Josephs | |
|---|---|---|---|
| 6,339,640 B1 * | 1/2002 | Chen et al. | 379/209.01 |
| 2002/0075905 A1 * | 6/2002 | Goldstein | 370/522 |
| 2008/0089505 A1 * | 4/2008 | Goldstein | 379/210.01 |

OTHER PUBLICATIONS

3rd Generation Partnership Project. 3GPP TS 22.093, V7.0.0 (Jun. 2007). 3rd Generation Partnership Project; Technical Specification Group Services and System Aspects; Completion of Calls to Busy Subscriber (CCBS); Service description, Stage 1 (Relsease 7). Jun. 2007.
Homayoon, S. et al. "Methods of Addressing the Interactions of Intelligent Newtork Services with Embedded Switch Services." IEEE Communication Magazine, Dec. 1988.

(Continued)

Primary Examiner — Harry Hong
(74) Attorney, Agent, or Firm — Coats & Bennett, P.L.L.C.

(57) ABSTRACT

Methods and devices for controlling a set-up of a call from a calling entity (CE201) to a called entity in a telecommunications network are described. The telecommunications network comprises a service control entity (SCE205) and a service switching entity (SSE204). The service control entity (SCE205) is adapted to perform the steps of receiving from the service switching entity (SSE204) an indication that the first call attempt failed, receiving from the service switching entity (SSE204) an indication of the further call attempt, obtaining call information related to the first call attempt, determining a call establishment procedure for the further call attempt based on the call information related to the first call attempt, sending an instruction to the service switching entity (SSE204) to continue the set-up of the further call attempt according to the call establishment procedure.

21 Claims, 8 Drawing Sheets

(56) References Cited

OTHER PUBLICATIONS

3rd Generation Partnership Project. "Technical Specification Group Services and System Aspects; Customised Applications for Mobile network Enhanced Logic (CAMEL); Service description; Stage 1 (Release 7)." Dec. 2005, pp. 1-94, 3GPP TS 22.078 V7.6.0, Sophia Antipolis, Valbonne, France.

3rd Generation Partnership Project. "Technical Specification Group Core Network and Terminals; Customised Applications for Mobile network Enhanced Logic (CAMEL) Phase 4; Stage 2 (Release 7)." Sep. 2007, pp. 1-738, 3GPP TS 23.078 V7.9.0, Sophia Antipolis, Valbonne, France.

3rd Generation Partnership Project. Technical Specification Group Core Network; Technical realization of Completion of Calls to Busy Subscriber (CCBS); Stage 2 (Release 7). Sep. 2007, pp. 1-164, 3GPP TS 23.093 V7.1.0, Sophia Antipolis, Valbonne, France.

3rd Generation Partnership Project. Technical Specification Group Core Network and Terminals; Customised Applications for Mobile network Enhanced Logic (CAMEL) Phase 4; Camel Applications Part (CAP) specification (Release 7). Sep. 2007, pp. 1-220, 3GPP TS 29.078 V7.4.0, Sophia Antipolis, Valbonne, France.

* cited by examiner

CONTROLLING A CALL COMPLETION

TECHNICAL FIELD

The present invention relates to telecommunications networks, in particular to methods and devices for controlling a call set-up in an Intelligent Network.

BACKGROUND

In a telecommunication network a call initiated by a calling entity to a called entity may not result in a successful connection between the two entities. For example, the called entity may be involved in another call, i.e. is busy, or is unable to answer the call at the time the call is made. In addition in mobile networks, the call may fail because the called entity may be not reachable for some reason. For example, the called entity may be located in an area that is shielded from radio reception or the called entity's user equipment may be turned off.

When a first call attempt fails, the calling entity can initiate a second call attempt at a later time. As the calling entity usually will not know when the circumstances that prevented the first call attempt from being completed have been corrected or changed, it is not uncommon that the calling entity may have to make several further call attempts before the call is finally completed.

In order to provide greater convenience to their subscribers, telecommunication service providers offer call completion services for use in situations where a call is not completed due to the called entity being unavailable, e.g. busy or not reachable. An example is the supplementary service Completion of Calls to Busy Subscriber (CCBS). CCBS has been specified for example in 3GPP ($3^{rd}$ Generation Partnership Project) TS (Technical Specification) 22.093.

When the called entity is busy or not reachable, the call completion services are typically designed to offer the calling entity an automatic call back when the called entity becomes available for the call back. Usually a switching node, such as a mobile switching center (MSC), that is serving the calling entity will offer the calling entity the option of an automatic call back when the called entity appears to be unavailable, e.g. busy or not reachable. If the calling entity accepts the offer, a procedure is started by a switching node serving the called entity for monitoring the availability of the called entity. As soon as it is detected that the called entity is available or idle again, i.e. no longer busy or in back radio contact with the network, then the switching entity serving the calling entity is notified. This switching entity will initiate a call towards the calling entity and if the calling entity answers, the call is set up to the called entity. Alternatively, the switching entity sends a designated notification to the calling entity, informing the calling entity that the called entity is now available, upon which the calling entity may initiate the establishment of the call to the called entity In addition to so-called network based services such as call completion services, i.e. services executed by and under the control of switching nodes, there are also Intelligent Network services that are executed and controlled by an Intelligent Network (IN). According to the IN concept, service intelligence or service logic is separated from switching functions. This separation basically enables network operators to develop and deploy services and features independently of vendors, allowing more flexibility in service development, simplified rollout, reduced costs and greater autonomy. Examples of IN protocols are the Intelligent Network Application Protocol (INAP), the Advanced IN (AIN), and the Customized Applications for Mobile network Enhanced Logic (CAMEL). INAP was developed for fixed line networks and is the primary protocol used for fixed line IN outside of North America. AIN is a variant developed for North America.

CAMEL is a Global System for Mobile communications (GSM) Phase 2+ and Wideband Code Division Multiple Access (WCDMA) network feature specified in 3GPP TS 22.078. CAMEL is based on core INAP with modifications to take into account, amongst others, subscriber mobility. In particular, CAMEL enables the use of operator-specific services by a subscriber even when roaming outside the subscriber's Home Public Land Mobile Network (PLMN). A CAMEL-based Intelligent Network comprises as main entities a service switching entity for switching tasks, also referred to as SSF (Service Switching Function) or gsmSSF (GSM Service Switching Function) and a service control entity comprising the service intelligence or logic also referred to as SCP (Service Control Point) or gsmSCF (GSM Service Control Function).

FIG. 1 depicts a schematic overview of a telecommunications network comprising an Intelligent Network according to the prior art.

The Intelligent Network comprises a service control point 101 and a service switching function 102. Furthermore, switching nodes MSC 103, MSC 104 and MSC 105 are depicted, each of which may be a Mobile Switching Centre (MSC). MSC 103 is serving the calling entity and MSC 105 is serving the called entity. FIG. 1 further depicts a calling entity CE100 and a called entity CE106.

Intelligent Networks services are executed by and under the control of the service control point 101. The service control point 101 is able to communicate with the service switching function 102 using an Intelligent Network protocol such as CAMEL or INAP. The service switching function 102 of this example is co-located at switching node 103, i.e. the switching node serving the calling entity. Alternatively, the service switching function 102 may be implemented as a separate node.

Call completion services as stated before, are network based services that are executed by and under control of switching nodes, whereas IN services are executed under the control of a service control entity and invoked for certain calls only. Because of the two levels of control that are also separate from each other, inconsistencies may occur when an IN service is invoked for a call that may be in addition subject to a call completion service. This may lead to call completion failures.

SUMMARY

It is therefore an object of the invention to provide methods, devices, and computer programs that improve completion of a call in a telecommunications network.

This object is achieved by the methods, devices, computer programs and a computer-readable medium product as described in the independent claims. Advantageous embodiments are described in the further claims.

In an embodiment a set-up of a call from a calling entity to a called entity in a telecommunications network is described. The call comprises a first call attempt and a further call attempt. The telecommunications network comprises a service control entity, a service switching entity, a switching node and a subscriber database.

The service control entity receives from the service switching entity an indication that the first call attempt failed at a first point in time. At a second point in time (e.g. seconds, minutes, hours, days later than the first point in time) the service control entity receives from the service switching entity an indication of the further call attempt, obtains call information related to the first call attempt, determines a call establishment procedure for the further call attempt based on the call information related to the first call attempt and sends an instruction to the service switching entity to continue the set-up of the further call attempt according to the call establishment procedure.

The service switching entity receives from the switching node an indication that the first call attempt failed at a first point in time and sends the indication that the first call attempt failed to the service control entity. At a second point in time the service switching entity receives from the switching node an indication of the further call attempt, sends the indication of the further call attempt to the service control entity, receives an instruction from the service control entity to continue the set-up of the further call attempt and establishes the further call attempt according to the instruction.

According to the embodiments, the service control entity is provided with an indication of the further call attempt. Now the service control entity is aware that the further call attempt relates to a failed first call attempt and hence that a network based call completion service is invoked. The service control entity obtains call information related to the first call attempt and determines a call establishment procedure to the further call attempt based on the call information related to the first call attempt. The service control entity is now fully empowered to take control of the further call attempt. The service control entity may determine how to continue the further call attempt. It may decide to apply the same call establishment procedure as for the first call attempt, or not to modify the further call attempt. Therefore inconsistencies in the handling of the further call attempt are avoided.

In an embodiment, the service control entity sends an instruction to initiate storing the call information related to the first call attempt to one of the service switching entity and a subscriber database connected to the service control entity and receives the stored call information related to the first call attempt in conjunction with receiving an indication of the further call attempt. This has the advantage that the service control entity is not required to occupy scarce internal memory resources for storing the call information, but leaves that to a designated node designed to store information over a longer period.

In an embodiment, the indication of the further call attempt is received by the service control entity in an initial message comprising an information element for indicating the further call attempt. The usage of an initial message advantageously provides that the service control entity is informed about the further call attempt at an initial stage of the call. It allows the service control entity to take control of the processing of the further call attempt at an early stage. The information element is preferably dedicated, i.e. pre-defined values may be used for indication of a further call attempt at pre-defined positions within the initial message with the pre-definitions known to both the service control entity and the service switching entity. A common notation with pre-defined values and a pre-defined position of the information element in the initial message eases the insertion and extraction of a value for both the service switching and service control entity. The initial message and the dedicated information element are preferably standardized although proprietary extensions may be used if standardization is not possible.

In an embodiment, the indication of the stored call information related to the first call attempt is received by the service control entity in an initial message comprising an information element for indicating the stored call information. The usage of an initial message advantageously provides that the service control entity gains knowledge about the stored call information related to the first call attempt at an initial stage of the further call attempt. It allows the service control entity to take control of the processing of the further call attempt at an early stage, even before the further call attempt has been completed.

In an embodiment, the call information indicates one of a charging rate of the call, a number translation scheme applicable to a destination number of the called entity and a supplementary service interaction indicator for the call. Applying the charging rate indicated in the call information related to the first call attempt has the advantage that the calling entity is charged according to the same charging rate as for the first call attempt even if the charging rate may have changed because of time of day or changed location of the calling entity.

In a further aspect a switching node sends an indication that the first call attempt failed to the service switching entity, receives from the service switching entity an instruction to initiate storing call information related to the first call attempt, sends to the subscriber database the instruction to initiate storing the call information related to the first call attempt, receives from the subscriber database an indication that the called entity is available, receives from the subscriber database the stored call information related tot the first call attempt, initiates a further call attempt from the calling entity to the called entity, sends an indication of the further call attempt to the service switching entity and sends the stored call information related to the first call attempt to the service switching entity.

In a further aspect a subscriber database receives an instruction to initiate storing call information related to the first call attempt, stores the call information related to the first call attempt, receives an indication that the called entity is available, sends the indication that the called entity is available to the switching node and sends the stored call information related to the first call attempt.

The invention furthermore concerns a service control entity, a service switching entity, a switching node and a subscriber database. It also concerns computer programs loadable into a processing unit of a service control entity, a service switching entity, a switching node and a subscriber database respectively to perform any of the steps of the aforementioned methods when operated at the respective device. The computer program can be stored on a computer readable medium. The computer-readable medium can be a permanent or rewritable memory within the service control entity, the service switching entity, the switching node or the subscriber database or located externally. The computer program can be also transferred to the service control entity, the service switching entity, the switching node or the subscriber database for example via a cable or a wireless link as a sequence of signals.

In the following, detailed embodiments of the present invention shall be described in order to give the skilled person a full and complete understanding. However, these embodiments are illustrative and are not intended to be limiting.

DETAILED DESCRIPTION

Figure 2:
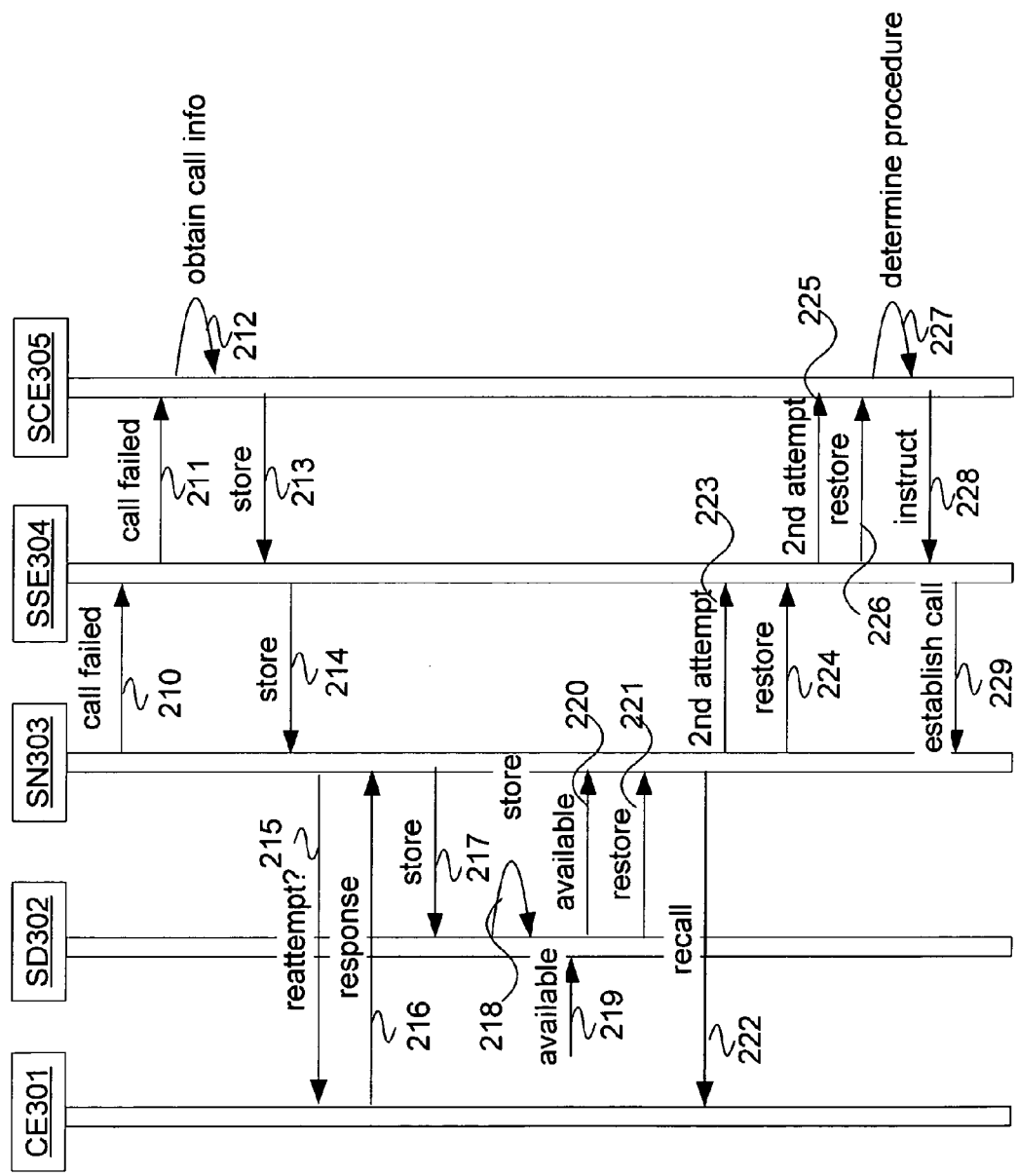
FIG. 2 shows a sequence diagram depicting messages exchanged in a telecommunication network in an exemplary embodiment of the invention.

FIG. 2 depicts a sequence diagram showing messages exchanged in a telecommunication network in an exemplary embodiment. Depicted are a calling entity CE201, a subscriber database SD202, a switching node SN203, a service switching entity SSE204 and a service control entity SCE205. The calling entity CE201 communicates to the switching node SN203. The subscriber database SD202 comprises subscriber information of the calling entity CE201 and is able to exchange information with the switching node SN203 and with further subscriber databases, e.g. a subscriber database associated to the called entity, not depicted in FIG. 2. The service switching entity SSE204 communicates with the switching node SN203. Preferably, the service switching entity SSE204 is co-located at the switching node SN203. The service control entity SCE205 comprises service logic for executing Intelligent Network services and is able to communicate with the service switching entity SSE204.

Figure 1:
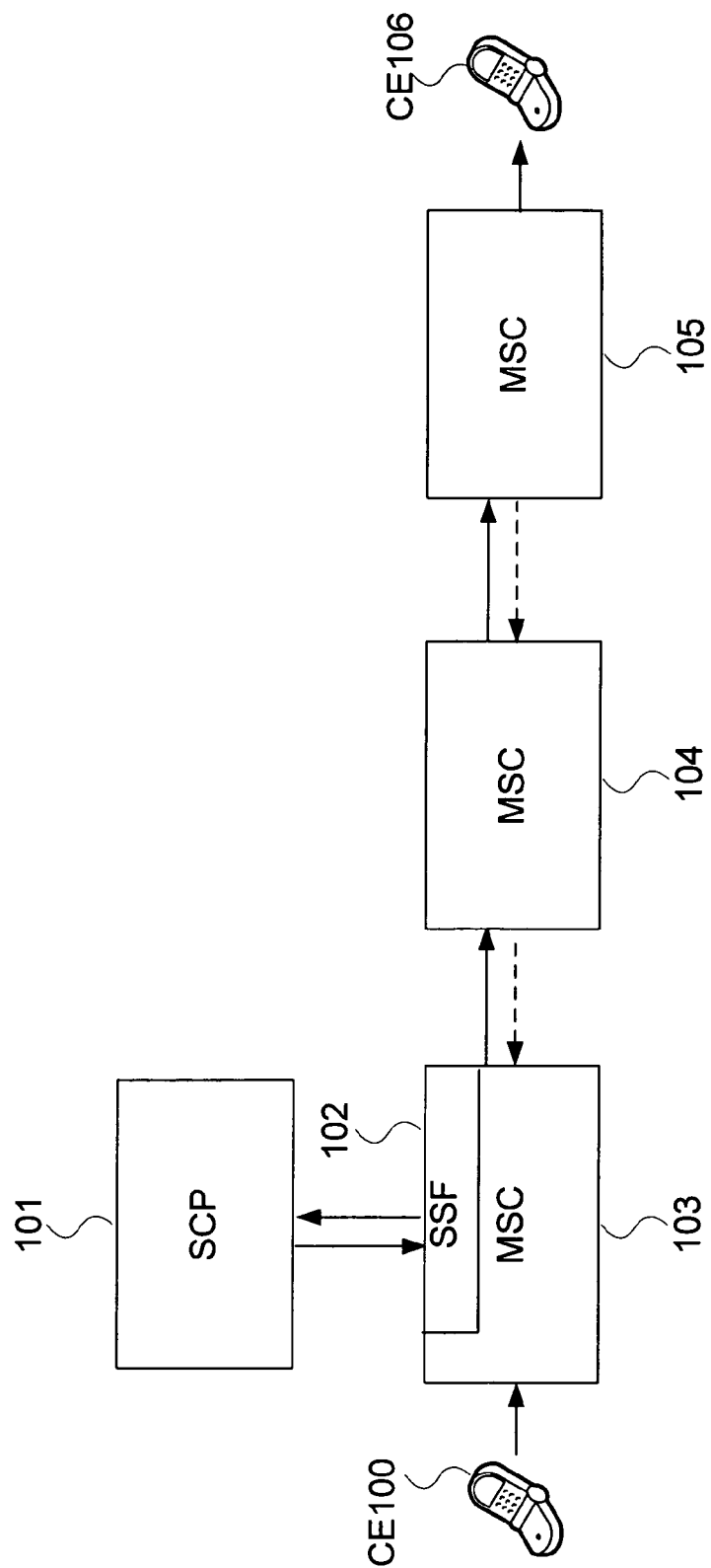
FIG. 1 shows a schematic illustration of a telecommunications network comprising an Intelligent Network according to the prior art.

The service control entity SCE205 and the service switching entity SSE204 are part of an intelligent network as described with reference to FIG. 1. The service control entity SCE205 has a similar function as the service control point 101 in FIG. 1, but is enhanced with new features as will be explained in details with reference to FIG. 7. The service switching entity SSE204 has a similar function as the service switching function 102 in FIG. 1, but is enhanced with new features as will be explained in details with reference to FIG. 8. The switching node SN203 is also part of the network described with reference to FIG. 1. The switching node SN203 has a similar function as the MSC 103 in FIG. 1, but is enhanced with new features as will be explained in details with reference to FIG. 9.

The embodiment depicted in FIG. 2 provides an exemplary sequence of messages exchanged between the devices introduced above, after detection of a first failed call attempt. The messages exchanged prior to the detection of the failure are ordinary messages used in the context of setting up a call between a calling entity and a called entity, and detecting that the called entity is not available and hence the first call attempt failed. In the following description the messages are referred to as steps being carried out as follows.

In a first step 210 when the switching node SN203 sends a notification to the service switching entity SSE204 that the first call attempt failed. The first call attempt may have failed due to e.g. the called entity being busy or not reachable, occurrence of congestion in the network, or the called entity not answering the call. The switching node SN203 may have received the indication from a further switching node serving the called entity, not depicted, the indication traversing the switching node serving the calling entity. According to an embodiment, the switching node SN203 may also send an indication of the cause of the failure to the service switching entity SSE204. The indication of the cause of the failure may be sent in the same message as the indication that the first call attempt failed, or in a separate message. The message may be a release (REL) message as specified in the Integrated Services Digital Network (ISDN) User Part (ISUP) call control protocol.

In a next step 211 the service switching entity SSE204 sends the indication that the first call attempt failed to the service control entity SCE205, for example in an event report. If the indication of the cause of the failure is received by the service switching entity SSE204 in step 210, it may also send the indication of the cause to the service control entity SCE205. The cause of the failure may, in a further embodiment, contain cause diagnostics, giving an indication whether a call completion service, such as CCBS, may apply for the call.

The service control entity SCE205 obtains call information related to the first call attempt in step 212. Call information may comprise indications of each of the following: a calling entity identifier, a called entity identifier, the dialed number (e.g. a short number associated to the called entity), the time and date of the first call attempt, and the location of the calling entity at the time of the first call attempt. According to a preferred embodiment, the call information may indicate additionally one of the following: a charging rate of the call, a number translation scheme applicable to a destination number of the called entity, a supplementary service interaction indicator for the call.

The service control entity SCE205 initiates storing the call information related to the first call attempt for later reference during a further call attempt. The call information may be stored in an internal memory of the service control entity SCE205. Alternatively, the service control entity SCE205 sends an instruction to another device for storing the call information. The latter embodiment is depicted in the following steps in FIG. 2.

According to step 213, the service control entity SCE205 sends an instruction to the service switching entity SSE204 to initiate storing the call information related to the first call attempt for later reference. The instruction may be sent in a CAMEL ContinueWithArgument (CWA) message. In a further embodiment, not depicted, the service control entity SCE205 sends the instruction to initiate storing the call information to the SD202 directly.

In step 214, the service switching entity 204 sends the instruction received in step 213 to the switching node SN203.

According to step 215, the switching node SN203 provides the calling entity CE201 with an option to initiate a further call attempt when the called entity becomes available. The calling entity CE201 sends a response to the switching node SN203 in step 216.

In step 217, the switching node SN203 sends the instruction received in step 214 to the subscriber database SD202, for example in a Mobile Application Part (MAP) message. According to an embodiment, the instruction is sent to the subscriber database SD202 on the condition that the response from the calling entity CD201 received in step 216 indicates that the calling party CE201 selects the option to initiate a further call attempt when the called party has become available.

The subscriber database SD202 stores in step 218 the call information related to the first call attempt in response to the instruction received from the switching node SN203. Alternatively, the instruction is received directly from the service control entity SCE205.

According to step 219, the subscriber database SD202 receives an indication that the called entity is available. The indication may be received from a subscriber database associated to the called entity.

The subscriber database SD202 sends in step 220 the indication that the called entity is available to the switching node SN203.

In step 221, the subscriber database SD202 sends the stored call information related to the first call attempt. If the instruction received in step 217 is received from the switching node SN203, the stored call information is sent back to the switching node SN203. According to an embodiment, steps 220 and 221 may be combined in one step, whereby the indication that the called entity is available and the stored call information are sent to the switching node SN203 in a MAP Remote user free message.

Alternatively, if the instruction received in step 217 is received from the service control entity SCE205 directly, the stored call information is sent back to the service control entity SCE205.

The exemplary method proceeds further to step 222 wherein the switching node SN203 performs the step of initiating a further call attempt from the calling entity CE201 to the called entity. According to an embodiment, the switching node SN203 sends a message to the calling entity CE201 to signal that the called entity is available. If the calling entity CE201 sends a message to the switching node SN203 indicating that it accepts the further call attempt, the switching node initiates the set up of the call attempt towards the called entity.

According to step 223, the switching node SN203 performs the step of sending an indication of the further call attempt to the service switching entity SSE204.

The switching node SN203 sends the stored call information related to the first call attempt to the service switching entity SSE204 in step 224. According to an embodiment, steps 223 and 224 may be combined in one step.

According to step 225, the service switching entity SSE204 sends the indication of the further call attempt to the service control entity SCE205. The service switching entity SSE204 may send the indication to the service control entity SCE205 in an initial message, preferably a CAMEL Initial Detection Point (IDP) message.

The service switching entity SSE204 sends the call information related to the first call attempt, if received from the switching node SN203, to the service control entity SCE205 in step 226. The call information may be sent in the same message as the indication of the further call attempt in step 225.

According to an alternative embodiment, the stored call information is received by the service control entity SCE205 directly from the subscriber database SD202. The service control entity SCE205 may send a request to the subscriber database SD202 for retrieving the stored call information.

In step 227, the service control entity SCE205 determines a call establishment procedure for the further call attempt based on the call information related to the first call attempt. Service logic of the service control entity SCE205 may analyze the call information obtained in the previous step and determine an appropriate call establishment procedure to be applied to the further call attempt using the call information of the first call attempt. The SCE205 may e.g. align call handling for the further call attempt with the call handling that was applied to the first call attempt. This may include e.g. using the same charging rate for the call and using the same number translation scheme.

According to step 228, an instruction is sent from the service control entity SCE205 to the service switching entity SSE204 to continue the set-up of the further call attempt according to the call establishment procedure.

In step 229, the service switching entity SSE204 sends a message to the switching node SD203 to establish the call in accordance with the instruction from the service control entity SCE205.

In the following paragraphs a detailed description is given with reference to FIGS. 3 to 6 of exemplary methods performed by the respective devices depicted in FIG. 2.

Figure 3:
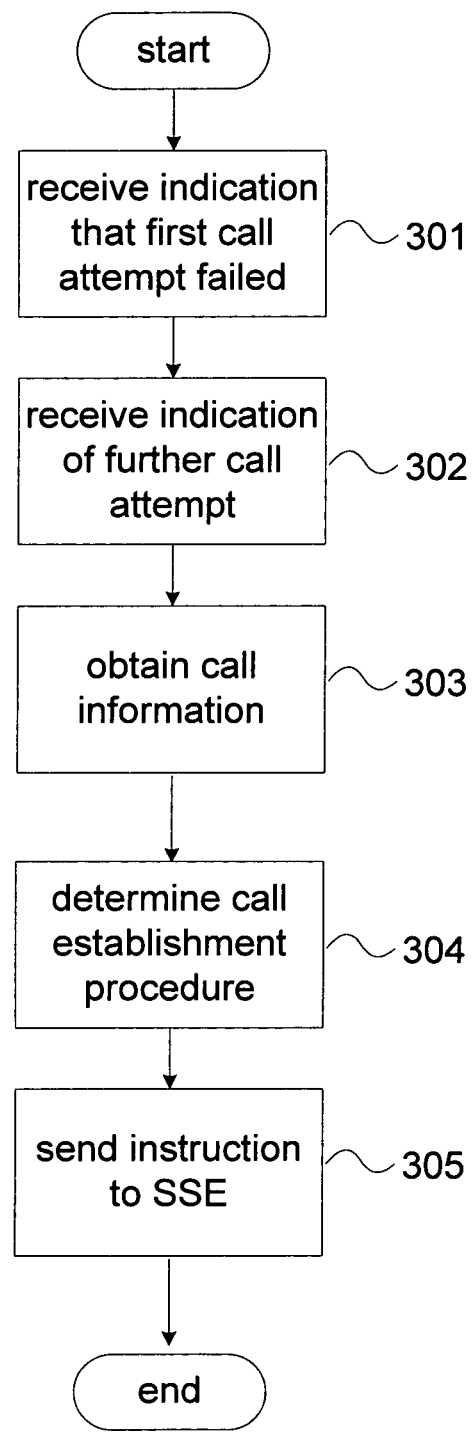
FIG. 3 shows a flow diagram of method steps performed by a service control entity.

FIG. 3 depicts exemplary steps performed by a service control entity according to an embodiment of the invention.

In an initial step a service switching entity sends a message to the service control entity, for example a CAMEL Event Report BCSM (Basic Call State Model) message, comprising an indication that a first call attempt from a calling entity to the called entity failed. The service switching entity may have received the indication from a switching node serving the called entity.

The service control entity performs the step of receiving the indication that the first call attempt failed in step 301. According to an embodiment, the service control entity may also receive an indication of the cause of the failure, e.g. the called entity being busy or not reachable, occurrence of congestion in the network, or the called entity not answering the call. The cause of the failure may, in a further embodiment, contain cause diagnostics. The service control entity may use the cause of the failure to decide on further actions for the call, enabling the service control entity to take even more knowledge into account when determining how to handle the call, and hence increase flexibility. The indication of the cause of the failure, including the cause diagnostics, may be received in the message comprising also the indication that the first call attempt failed, or in a separate message.

The method may proceed further to step 302 wherein the service control entity performs the step of receiving from the service switching entity an indication of a further call attempt from the calling entity to the called entity. The service control entity is now informed that a further call attempt is initiated related to a first call attempt that failed. According to an embodiment, the indication of the further call attempt may be received in an initial message, for example a CAMEL Initial Detection Point (IDP) message, comprising an information element for indicating the further call attempt.

In step 303, call information related to the first call attempt is obtained by the service control entity. Call information may comprise indications of each of the following: a calling entity identifier, a called entity identifier, the dialed number (e.g. a short number associated to the called entity), the time and date of the first call attempt, and the location of the calling entity at the time of the first call attempt. According to a preferred embodiment, the call information may indicate additionally one of the following: a charging rate of the call, a number translation scheme applicable to a destination number of the called entity and a supplementary service interaction indicator for the call.

In an embodiment, the call information related to the first call attempt is obtained from the internal memory of the service control entity after it was stored during the first call attempt. Alternatively, the service control entity may have sent earlier an instruction to the service switching entity to initiate storing the call information related to the first call attempt, for example in a subscriber database. The instruction may be sent in a CAMEL ContinueWithArgument (CWA) message. The subscriber database that may store the call information may be a Home Location Register (HLR) associated to the calling entity. In a further alternative embodiment, the service control entity sends the instruction to initiate storing the call information related to the first call attempt to the subscriber database directly.

The stored call information related to the first call attempt may subsequently be restored during the set-up of the further call attempt. It may be received by the service control entity, via the service switching entity and further switching nodes between the subscriber database and the service switching entity, in conjunction with the step of receiving an indication of the further call attempt. In a preferred embodiment, the stored call information related to the first call attempt may be received in the same initial message as the indication of the further call attempt. The initial message may comprise an information element for indicating the stored call information. According to an alternative embodiment, the stored call information is received by the service control entity directly from the subscriber database. The service control entity may request the subscriber database to send the stored call information.

According to step 304, the service control entity performs the step of determining a call establishment procedure for the further call attempt based on the call information related to the first call attempt. Service logic of the service control entity may analyze the call information obtained in the previous step and determine an appropriate call establishment procedure to be applied to the further call attempt using the call information of the first call attempt. For example, the service control entity may decide to leave the destination number as received associated to the called entity unchanged, i.e. not apply a number translation scheme to the further call attempt. For example, the service control entity may decide to leave the destination number as received associated to the called entity unchanged, i.e. not apply a number translation scheme to the further call attempt. This is particularly advantageous in the following situation. It may occur that a switching node that is executing the call completion service after control of the call is returned from the service control entity, releases the call when it recognizes that the destination number has been changed by a service in the service control entity, e.g. a Virtual Private Network service (VPN). Reason for this behavior is that the further call attempt is no longer regarded as related to the first call attempt by the switching node and is deemed unallowable. According to the steps performed by the service control entity, the service control entity is aware that the further call attempt relates to a failed first call attempt and it may decide not to modify the destination number. Hence, the further call attempt may be established by the switching node. In another example or in addition, the service control entity may determine a call establishment procedure that applies the same charging rate as was applied to the first call attempt. This has the advantage that the calling entity is charged according to the same charging rate as for the first call attempt even if the charging rate may have changed because of time of day or changed location of the calling entity.

In a further example the service control entity may determine a call establishment procedure that applies the same supplementary service interaction indicator as was applicable to the first call attempt according to the stored call information related to the first call attempt.

According to step 305, an instruction is sent from the service control entity to the service switching entity to continue the set-up of the further call attempt according to the call establishment procedure. The instruction may be sent in a CAMEL Connect, Continue or a ContinueWithArgument message, depending on the type of instruction. The service control entity may, prior to sending the instruction and depending on the type of instruction, provide the service switching entity with charging instructions, such as CAMEL Apply charging, Furnish charging information or Send charging information.

The method may end here or may continue with any of the steps described herein.

Figure 4:
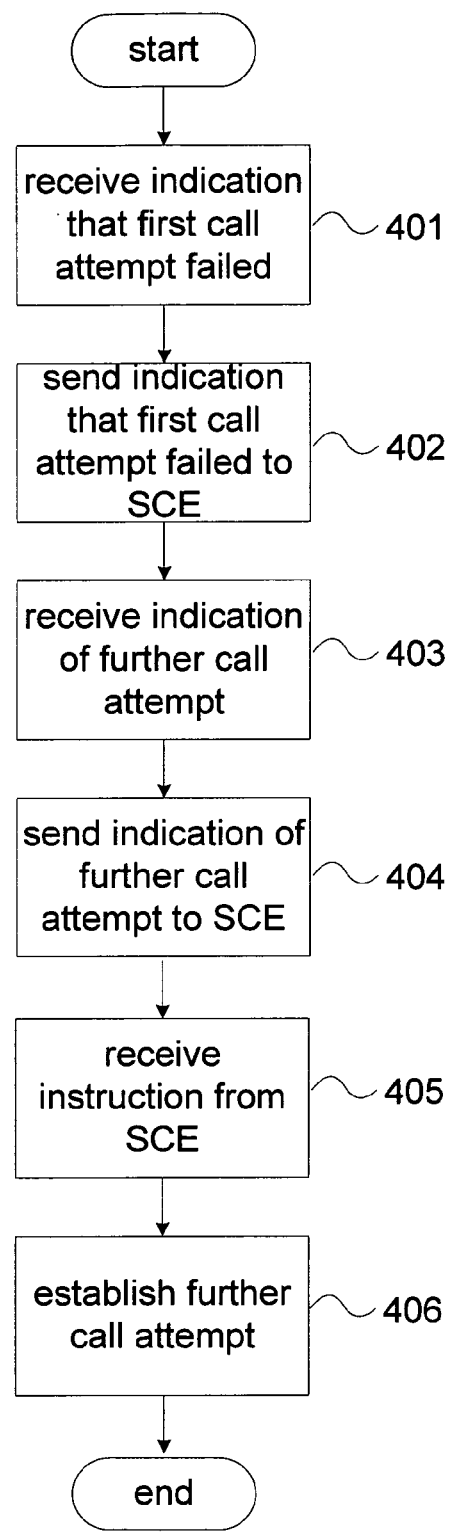
FIG. 4 shows a flow diagram of method steps performed by a service switching entity.

FIG. 4 shows exemplary steps performed by a service switching entity according to an embodiment of the invention.

In an initial step a switching node passes on a message to the service switching entity comprising an indication that a first call attempt from a calling entity to a called entity has failed.

According to step 401 the service switching entity may perform the step of receiving from the switching node the indication that the first call attempt to the called entity has failed. The message comprising the indication that the first call attempt failed may also comprise an indication of the cause of the failure, e.g. the called entity being busy or not reachable, occurrence of congestion in the network, or the called entity not answering the call. The message may be an ISUP release (REL) message.

Subsequently, the service switching entity performs the step of sending the indication that the first call attempt failed to a service control entity in step 402. The service switching entity may send the indication to the service control entity in an event report, preferably a CAMEL Event Report BCSM message. In an embodiment, the service switching entity may also send the indication of the cause of the failure, if received from the switching node, to the service control entity in the same or a separate message.

According to an embodiment, the service switching entity may receive an instruction from the service control entity to initiate storing call information related to the first call attempt, for example in a subscriber database. The instruction may be received in a CAMEL ContinueWithArgument (CWA) message. The subscriber database that may store the call information may be a Home Location Register (HLR) associated to the calling entity. The service switching entity may send the instruction to a switching node for further forwarding towards the subscriber database.

In step 403 the service switching entity may perform the step of receiving from the switching node an indication that a further call attempt to the called entity has been initiated. The indication may be received in an ISUP IAM (Initial Address Message). The ISUP protocol that is used between the switching node and the service switching entity may be external ISUP or node-internal ISUP.

According to an embodiment, the earlier stored call information related to the first call attempt may be received by the service switching entity, via one or more switching nodes, from the subscriber database in conjunction with the step of receiving an indication of the further call attempt. In a preferred embodiment, the stored call information related to the first call attempt may be received in the same message as the indication of the further call attempt, for example the ISUP IAM message. The message may comprise an information element for indicating the stored call information.

According to step 404, the service switching entity performs the step of sending the indication of the further call attempt to a service control entity. The service switching entity may send the indication to the service control entity in an initial message, preferably a CAMEL Initial Detection Point (IDP) message. The message may comprise an information element for indicating that the further call attempt relates to a first call attempt that failed. In a further embodiment, the service switching entity may send the call information related to the first call attempt, if received from the switching node, to the service control entity in the same or a separate message. The initial message may comprise an information element for indicating the stored call information.

According to step 405 the service switching entity performs the step of receiving an instruction from the service control entity to continue the set-up of the further call attempt. The instruction may be received in a CAMEL Connect, Continue or a ContinueWithArgument message, depending on the type of instruction. The service switching entity may, prior to receiving the instruction, receive charging instructions, such as CAMEL Apply charging, Furnish charging information or Send charging information.

The method may proceed further to step 406 wherein the service switching entity performs the step of executing the instruction, that is, establishing the further call attempt according to the instruction received.

The method may end here or may continue with any of the steps described herein.

Figure 5:
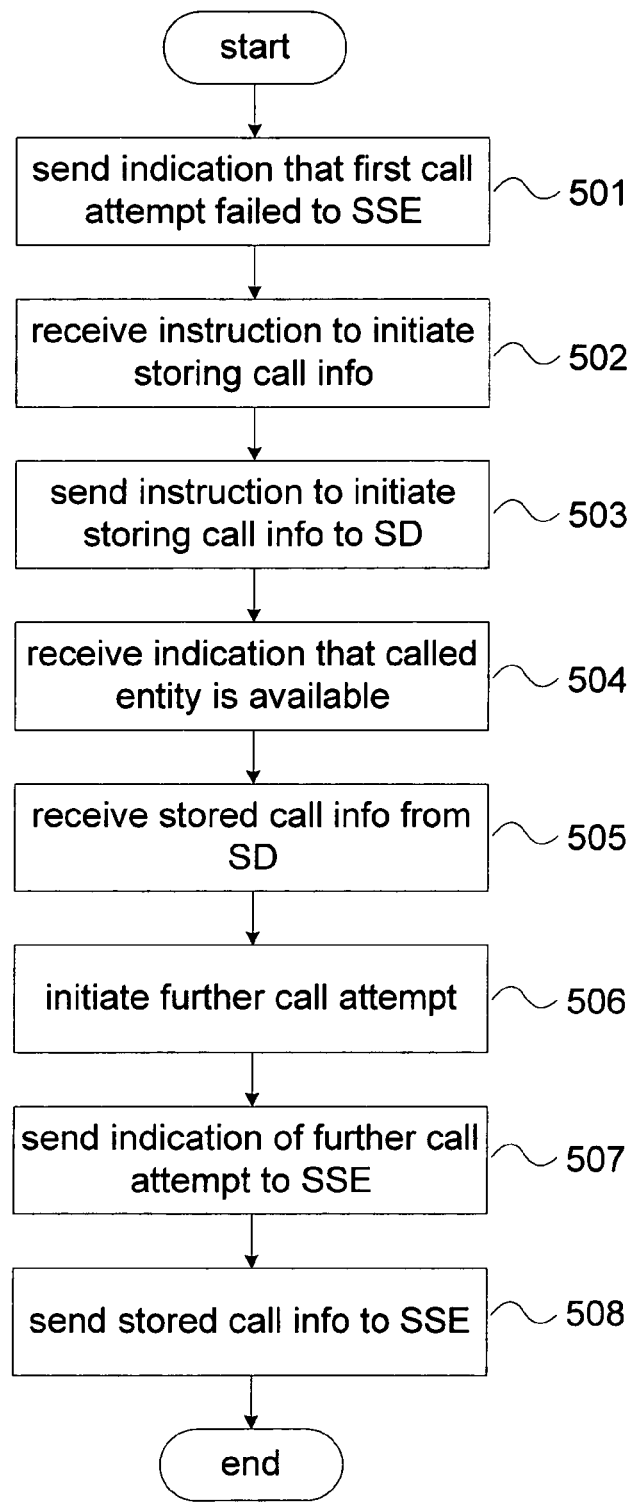
FIG. 5 shows a flow diagram of method steps performed by a switching node.

FIG. 5 shows exemplary steps performed by a switching node according to an embodiment of the invention. The switching node may be a Mobile Switching Centre (MSC).

In a first step 501 the switching node performs the step of sending an indication to a service switching entity that a first call attempt from a calling entity to a called entity failed. The switching node may have received the indication from a further switching node serving the called entity. The switching node may send the indication that the first call attempt failed to the service switching entity in a message comprising also an indication of the cause of the failure, e.g. the called entity being busy or not reachable, occurrence of congestion in the network, or the called entity not answering the call. The cause of the failure may optionally comprise cause diagnostics. The message may be an ISUP release (REL) message.

The method may proceed further to step 502 wherein the switching node performs the step of receiving an instruction from the service switching entity to initiate storing call information related to the first call attempt.

In step 503, the switching node sends the instruction received in step 502, towards a subscriber database, preferably a Home Location Register (HLR) associated to the calling entity. The switching node may send the instruction in a Mobile Application Part (MAP) message. According to an embodiment, the switching node may provide the calling entity with an option to initiate a further call attempt when the called entity becomes available. The calling entity sends a response to the switching node. According to a further embodiment, step 503, i.e. sending the instruction to initiate storing the call information related to the first call attempt to the subscriber database, is performed on the condition that the response from the calling entity indicates that the calling party selects the option to receive an offer for a further call attempt, when the called entity becomes available.

According to step 504, the switching node may receive an indication that the called entity is available. According to an embodiment, the indication is received from a subscriber database associated to the called entity, via the subscriber database associated to the calling entity.

The switching node receives the stored call information related to the first call attempt from the subscriber database, preferably the subscriber database associated to the calling entity, in step 505. According to an embodiment, steps 504 and 505 may be combined in one step, whereby the indication that the called entity is available and the stored call information are received by the switching node in a MAP Remote user free message.

The exemplary method proceeds further to step 506 wherein the switching node performs the step of initiating a further call attempt from the calling entity to the called entity. According to an embodiment, the switching node sends a message to the calling entity to signal that the called entity is available. If the calling entity sends a message to the switching node indicating that it accepts the further call attempt, the switching node initiates the set up of the call attempt towards the called entity.

According to step 507, the switching node performs the step of sending an indication of the further call attempt to the service switching entity. The switching node sends the indication for example in an ISUP Initial Address Message (IAM) to the service switching entity.

In step 508, the switching node sends the stored call information related to the first call attempt to the service switching entity. According to an embodiment, steps 507 and 508 may be combined in one step, whereby the indication of the further call attempt and the stored call information are sent to the service switching entity in one ISUP Initial Address Message (IAM). The IAM message comprises an information element for indicating the stored call information.

The switching node may at this point receive instructions from the service switching entity for the establishment of the further call attempt, which may be based on the call information related to the first call attempt.

The method may end here or may continue with any of the steps described herein.

Figure 6:
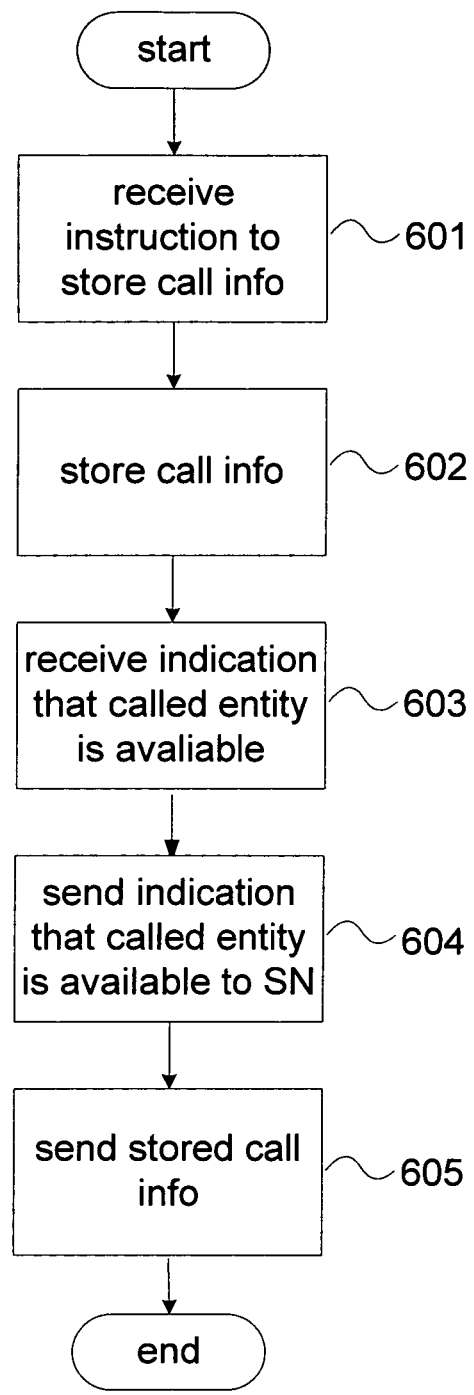
FIG. 6 shows a flow diagram of method steps performed by a subscriber database.

FIG. 6 shows exemplary steps performed by a subscriber database according to an embodiment of the invention. The subscriber database may be a Home Location Register (HLR). Preferably it is a HLR associated to a calling entity.

In a first step 601 the subscriber database receives an instruction to store call information related to a first call attempt from a calling entity to a called entity. The instruction is received for example in a MAP Call Completion to Busy Subscriber (CCBS) Request message. The MAP CCBS Request message comprises an information element for indicating the call information related to the first call attempt. According to an embodiment, the instruction is received from a switching node. Alternatively, the instruction is received from the service control entity.

In a next step 602, wherein the subscriber database stores the call information related to the first call attempt. The subscriber database may receive multiple requests for storing call information related to respective multiple first call attempts associated to the same calling party. The call information associated to each of the multiple first call attempts may be stored individually by the subscriber database.

According to step 603, the subscriber database receives an indication that the called entity is available. The indication may be received from a subscriber database associated to the called entity.

The subscriber database sends in step 604 the indication that the called entity is available to the switching node.

In step 605, the subscriber database sends the stored call information related to the first call attempt. If the instruction received in step 601 is received from the switching node, the stored call information is sent back to the switching node. According to an embodiment, steps 604 and 605 may be combined in one step, whereby the indication that the called entity is available and the stored call information are sent to the switching node in a MAP Remote user free message. Alternatively, if the instruction received in step 601 is received from the service control entity directly, the stored call information is sent back to the service control entity.

Preferably, the call information in the subscriber database is removed after it is sent to either the switching node or the service control entity. It will also be removed if the indication that the called entity is available is not received within a predetermined time limit, or when the CCBS user data is removed from the subscriber database for any other reason.

The method may end here or may continue with any of the steps described herein.

The invention is furthermore embodied in devices which are described in more detail below in relation to FIGS. 7, 8, 9 and 10. Reference signs are used for illustration only and are not intended to be limiting.

Figure 7:
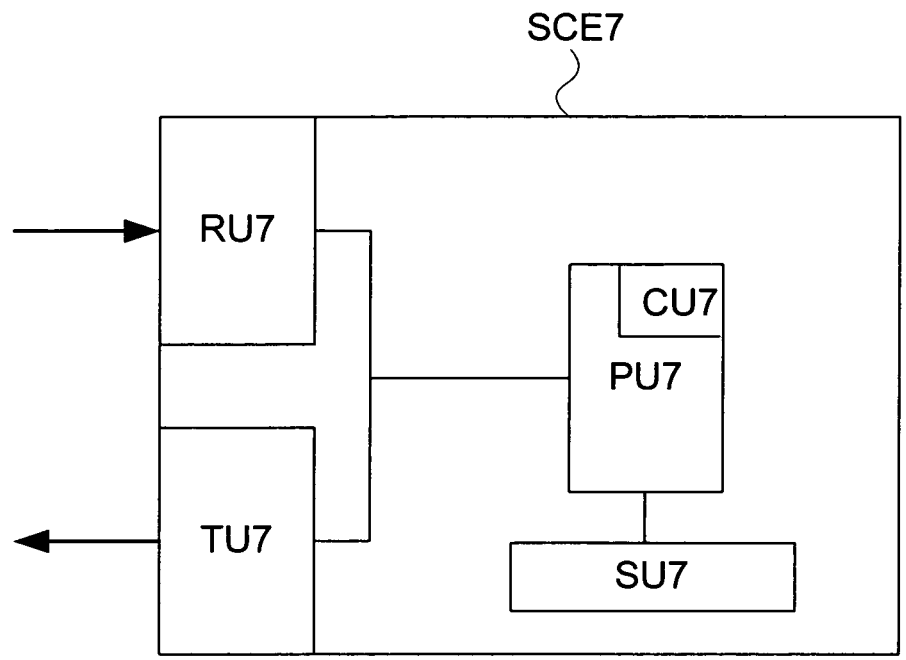
FIG. 7 shows a block diagram of an embodiment of a service control entity.

FIG. 7 depicts an embodiment of a service control entity SCE7 comprising a receiving unit RU7 for receiving messages, a transmitting unit TU7 for transmitting messages, a processing unit PU7 for processing messages and information comprising a call information handling unit CU7, and preferably a storage unit SU7 for storing and/or obtaining of stored information.

A service control entity may be a stand alone device. However, it is also conceivable that a service control entity is operating at a switching node, e.g. as a hardware and/or software sub-unit of the switching node. The service control entity may be installed and operated at the switching node sharing none of the units RU7, TU7, PU7, SU7 with the switching node or sharing at least one of the units RU7, TU7, PU7, SU7 with units of a switching node. An alternative embodiment is a service control entity according to a computer program loaded into the processing unit of a switching node.

The processing unit PU7 may be adapted to process an indication that the first call attempt failed, received via the receiving unit RU7 from the service switching entity. Furthermore, the processing unit PU7 may be adapted to process an indication of the further call attempt, received via the receiving unit RU7 from the service switching entity. The call information handling unit CU7 may be adapted to obtain call information related to the first call attempt. The processing unit PU7 may be further adapted to determine a call establishment procedure for the further call attempt based on the call information related to the first call attempt, and to initiate a transmission via the transmission unit TU7 of an instruction to the service switching entity to continue the set-up of the further call attempt according to the call establishment procedure.

According to an embodiment, the call information handling unit CU7 may be adapted to initiate a transmission via the transmission unit TU7 to one of the service switching entity and a subscriber database connected to the service control entity, of an instruction to initiate storing the call information related to the first call attempt. Further, the call information handling unit CU7 may be adapted to process the stored call information related to the first call attempt, received via the receiving unit RU7 in conjunction with receiving the indication of the further call attempt.

Preferably, the indication of the further call attempt is received at the receiving unit RU7 in an initial message comprising an information element for indicating the further call attempt. The processing unit PU7 may be adapted to process this information. In particular, the processing unit PU7 may be adapted to extract the information from the message and to obtain the indication of the further call attempt from the extracted information. In addition, the stored call information related to the first call attempt is preferably received in an initial message. The call information handling unit CU7 may further be adapted to extract the stored call information from the message and to obtain the stored call information, based on which the determination of the call establishment procedure for the further call attempt can be executed by the processing unit PU7.

In an embodiment, the call information indicates one of a charging rate of the call, a number translation scheme applicable to a destination number of the called entity and a supplementary service interaction indicator for the call.

Figure 8:
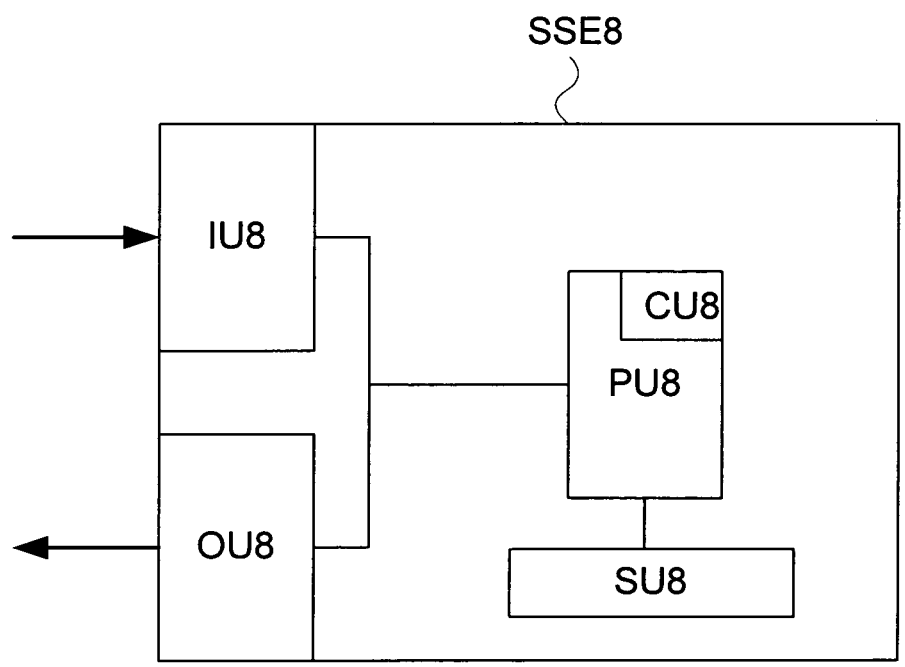
FIG. 8 shows a block diagram of an embodiment of a service switching entity.

FIG. 8 depicts an embodiment of a service switching entity SSE8 comprising an input unit IU8, an output unit OU8, a processing unit PU8 for processing messages and information comprising a call information handling unit CU8, and preferably a storage unit SU8 for storing and/or obtaining of information.

A service switching entity may be a stand alone device and input unit IU8 and output unit OU8 being external interfaces like a receiving unit for receiving messages and a transmission unit for transmitting messages, respectively. Preferably, a service switching entity is operating at a switching node, e.g. as a hardware and/or software sub-unit of the switching node. The service switching entity may be installed and operated at the switching node sharing none of the units IU8, OU8, PU8, SU8 with the switching node or sharing at least one of the units IU8, OU8, PU8, SU8 with units of a switching node comprising a receiving unit for receiving messages, a transmission unit for sending messages, a processing unit for processing messages and information, and preferably a storage unit. A preferred embodiment is a service switching entity according to a computer program loaded into the processing unit of a switching node.

The processing unit PU8 may be adapted to process an indication that the first call attempt failed, received via the input unit IU8 from a switching node, and to initiate a sending of the indication, via the output unit OU8, to a service control entity. Furthermore, the processing unit PU8 may be adapted to process an indication of the further call attempt, received via the input unit IU8 from the switching node, and to initiate a transmission of the indication of the further call attempt, via the output unit OU8, to the service control entity. The processing unit PU8 may be further adapted to process an instruction, received via the input unit IU8 from the service control entity, to continue the set-up of the further call attempt and to establish the further call attempt according to the instruction received.

According to an embodiment, the input unit IU8 may be adapted to receive an instruction to initiate storing the call information related to the first call attempt from the service control entity. The call information handling unit CU8 may be adapted to initiate a transmission, via the output unit OU8 to the switching node, of the instruction to initiate storing the call information related to the first call attempt. Further, the input unit IU8 may be adapted to receive the stored call information related to the first call attempt from the switching node, in conjunction with receiving the indication of the further call attempt. The call information handling unit CU8 may be adapted further to initiate a sending via the output unit OU8 to the service control entity of the stored call information related to the first call attempt, in conjunction with sending the indication of the further call attempt.

Preferably, the call information handling unit CU8 may be further adapted to initiate sending the stored call information related to the first call attempt via the output unit OU8 to the service control entity in an initial message comprising an information element for indicating the stored call information. Additionally, the processing unit PU8 may be adapted to initiate transmitting the indication of the further call attempt via the output unit OU8 to the service control entity in an initial message comprising an information element for indicating the further call attempt.

In an embodiment, the call information indicates one of a charging rate of the call, a number translation scheme applicable to a destination number of the called entity and a supplementary service interaction indicator for the call.

Figure 9:
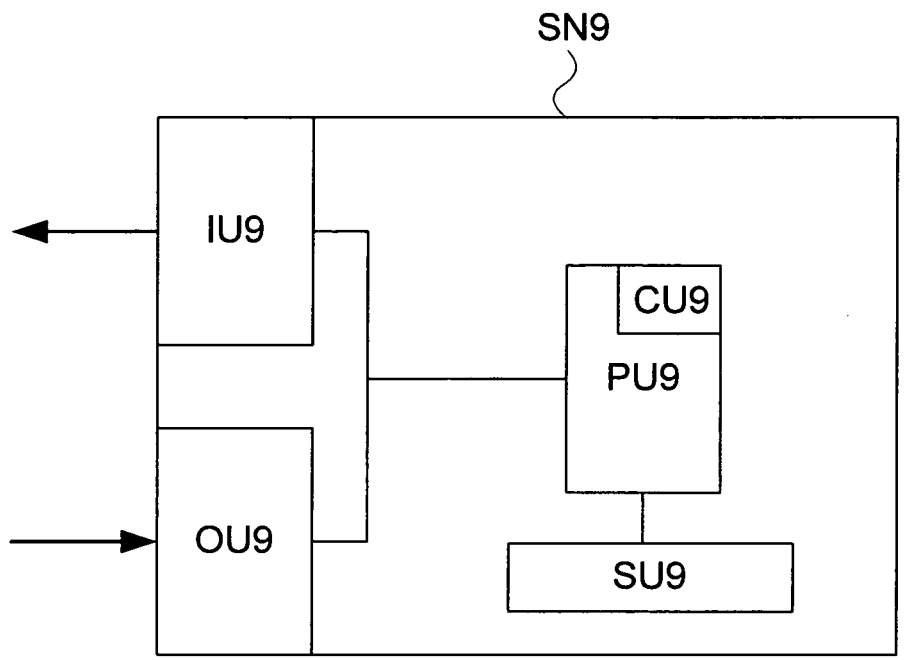
FIG. 9 shows a block diagram of an embodiment of a switching node.

FIG. 9 depicts an embodiment of a switching node SN9 comprising an input unit IU9, an output unit OU9, a processing unit PU9 for processing messages and information comprising a call information handling unit CU9, and preferably a storage unit SU9 for storing and/or obtaining of information.

The processing unit PU9 may be adapted to initiate a sending of an indication that a first call attempt failed, via the output unit OU9, to a service switching entity. The input unit IU9 may be adapted to receive an instruction to initiate storing the call information related to the first call attempt from the service switching entity. The call information handling unit CU9 may be adapted to initiate a transmission, via the output unit OU9 to a subscriber database, of the instruction to initiate storing the call information related to the first call attempt. Further, the input unit IU9 may be adapted to receive from the subscriber database an indication that the called entity is available and to receive the stored call information related to the first call attempt. The processing unit PU9 may be adapted to initiate a further call attempt from the calling entity to the called entity and to initiate a transmission of an indication of the further call attempt via the output unit OU9 to the service switching entity. The call information handling unit CU9 may be adapted further to initiate a sending via the output unit OU9 to the service switching entity of the stored call information related to the first call attempt.

According to an embodiment, the processing unit PU9 may be adapted to provide the calling entity, via the output unit OU9, with an option to initiate the further call attempt when the called entity becomes available and to process a response from the calling entity to the option, received via the input unit IU9.

Figure 10:
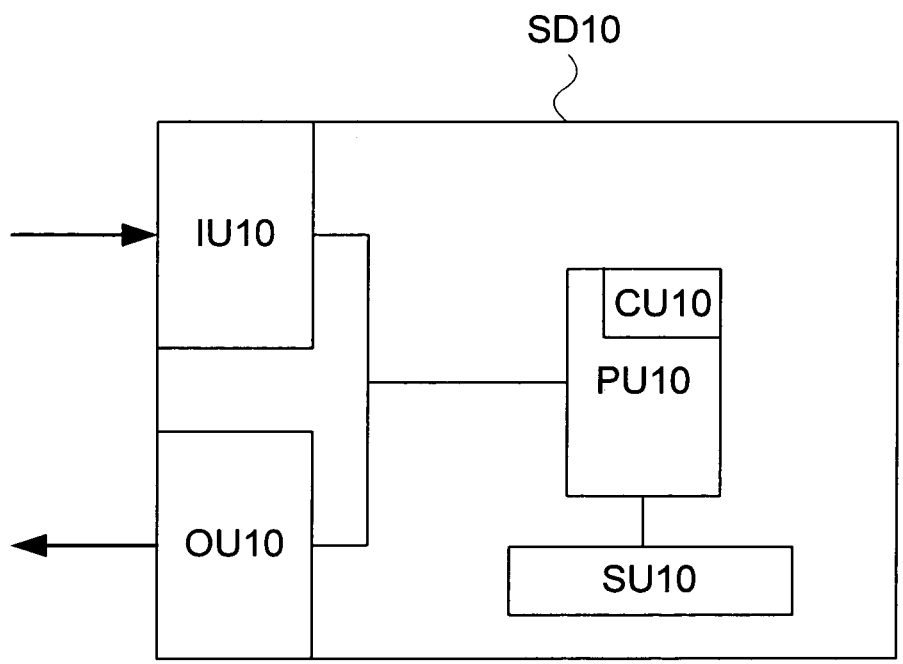
FIG. 10 shows a block diagram of an embodiment of a subscriber database.

FIG. 10 depicts an embodiment of a subscriber database SD10 comprising an input unit IU10, an output unit OU10, a processing unit PU10 for processing messages and information comprising a call information handling unit CU10, and preferably a storage unit SU10 for storing and/or obtaining of information.

The input unit IU10 may be adapted to receive an instruction to initiate storing call information related to a first call attempt. The call information handling unit CU10 may be adapted to store the call information related to the first call attempt in the storage unit SU10. Further, the input unit IU10 may be adapted to receive an indication that the called entity is available. The processing unit PU10 may be adapted to initiate the transmission of the indication that the called entity is available to the switching node, via the output unit OU10. The call information handling unit CU10 may be further adapted to retrieve the stored call information related to the first call attempt from the storage unit SU10 and to initiate the sending of the stored call information related to the first call attempt via the output unit OU10.

According to an embodiment, the instruction to initiate storing call information related to a first call attempt is received via the input unit IU10 from a switching node. Further, the stored call information related to the first call attempt is sent, via the output unit OU10, to the switching node.

According to another embodiment, the instruction to initiate storing call information related to a first call attempt is received via the input unit IU10 from a service control entity.

In addition, the stored call information related to the first call attempt is sent, via the output unit OU10, to the service control entity.

IN protocols like INAP and CAMEL Application Part (CAP, e.g. CAPv4, see 3GPP TS 29.078 and 3GPP TS 23.078) are preferably amended by at least one of the following detailed enhancements to provide a service switching entity and a service control entity with the capabilities according to the invention:

a) A new information element (IE) may be added to the "Initial Detection Point" (InitialDP or IDP in short) message for indicating to the service control entity that the invocation relates to a further call attempt related to a first call attempt that failed:

| Information Element name | Description |
| --- | --- |
| Call completion service set-up | This IE indicates that the service invocation relates to a further call attempt related to a first call attempt that failed. |

The IDP comprising the new information element may be used by the service switching entity to send the indication of the further call attempt to the service control entity.

b) A new information element (IE) may be added to the "Initial Detection Point" (InitialDP or IDP in short) message for indicating to the service control entity the stored call information related to the first call attempt.

| Information Element name | Description |
| --- | --- |
| Call information free format data | This IE comprises an indication of the call information related to the first call attempt |

The IDP comprising the new information element may be used by the service switching entity to send the indication of the call information related to the first call attempt to the service control entity.

c) The message "ContinueWithArgument" (CWA) may be used to carry information regarding the instruction to initiate storing the call information related to the first call attempt to the service switching entity for the further call attempt. A new "call information free format data" information element (IE) may be added to the "ContinueWithArgument" for this purpose.

| Information Element name | Description |
| --- | --- |
| Call information free format data | This IE comprises an indication of the call information related to the first call attempt |

The "ContinueWithArgument" message comprising the new Call information free format data may be used by the service control entity to send an instruction to the service switching entity to initiate storing the call information.

Furthermore, the MAP protocol is preferably amended by the following enhancement to provide a switching node and a subscriber database with the capabilities according to the invention.

a) A new information element (IE) may be added to the MAP REGISTER CC ENTRY message, the MAP CCBS REQUEST message and to the MAP REMOTE USER FREE message for indicating the stored call information related to the first call attempt.

| Information Element name | Description |
|---|---|
| Call information free format data | This IE comprises an indication of the call information related to the first call attempt |

It is apparent that the invention may be implemented in any telecommunication network like a GSM, Code Division Multiple Access (CDMA), Time Division Multiple Access (TDMA), Universal Mobile Telecommunication System (UMTS), or 4G network. A service control entity is typically embodied in a single device or may be distributed over several devices. The corresponding applies to a service switching entity. A service control entity and a service switching entity may be implemented as separate functions on the same device or platform.

The invention claimed is:

1. A method for controlling a set-up of a call from a calling entity to a called entity in a telecommunications network, the call comprising a first call attempt and a further call attempt, the telecommunications network comprising a service control entity and a service switching entity, wherein the service control entity performs the steps of:
   receiving from the service switching entity an indication that the first call attempt failed;
   receiving from the service switching entity an indication of the further call attempt;
   obtaining call information related to the first call attempt;
   determining a call establishment procedure for the further call attempt based on the call information related to the first call attempt; and
   sending an instruction to the service switching entity to continue the set-up of the further call attempt according to the call establishment procedure.

2. The method of claim 1, further comprising:
   sending an instruction to initiate storing the call information related to the first call attempt to one of: the service switching entity and a subscriber database connected to the service control entity; and
   receiving the stored call information related to the first call attempt in conjunction with receiving an indication of the further call attempt.

3. The method of claim 1, wherein the indication of the further call attempt is received in an initial message comprising an information element for indicating the further call attempt.

4. The method of claim 2, wherein the stored call information relating to the first call attempt is received in an initial message comprising an information element for indicating the stored call information.

5. The method of claim 1, wherein the call information indicates one of a charging rate of the call, a number translation scheme applicable to a destination number of the called entity and a supplementary service interaction indicator for the call.

6. A method for controlling a set-up of a call from a calling entity to a called entity in a telecommunications network, the call comprising a first call attempt and a further call attempt, the telecommunications network comprising a service control entity, a service switching entity and a switching node, wherein the service switching entity performs the steps of:
   receiving from the switching node an indication that the first call attempt failed;
   sending the indication that the first call attempt failed to the service control entity;
   receiving from the switching node an indication of the further call attempt;
   sending the indication of the further call attempt to the service control entity;
   receiving an instruction from the service control entity to continue the set-up of the further call attempt, and
   establishing the further call attempt according to the instruction.

7. The method of claim 6, further comprising:
   receiving from the service control entity an instruction to initiate storing call information related to the first call attempt;
   sending to the switching node the instruction to initiate storing the call information related to the first call attempt;
   receiving from the switching node the stored call information related to the first call attempt in conjunction with receiving the indication of the further call attempt; and
   sending to the service control entity the stored call information related to the first call attempt in conjunction with sending the indication of the further call attempt.

8. The method of claim 7, wherein the stored call information relating to the first call attempt is sent to the service control entity in an initial message comprising an information element for indicating the stored call information.

9. The method of claim 7, wherein the indication of the further call attempt is sent to the service control entity in an initial message comprising an information element for indicating the further call attempt.

10. The method of claim 7, wherein the call information indicates one of: a charging rate of the call, a number translation scheme applicable to a destination number of the called entity and a supplementary service interaction indicator for the call.

11. A method for controlling a set-up of a call from a calling entity to a called entity in a telecommunications network, the call comprising a first call attempt and a further call attempt, the telecommunications network comprising a service control entity, a service switching entity, a subscriber database and a switching node, wherein the switching node performs the steps of:
   sending an indication that the first call attempt failed to the service switching entity;
   receiving from the service switching entity an instruction to initiate storing call information related to the first call attempt;
   sending to the subscriber database the instruction to initiate storing the call information related to the first call attempt;
   receiving from the subscriber database an indication that the called entity is available;
   receiving from the subscriber database the stored call information related to the first call attempt;
   initiating a further call attempt from the calling entity to the called entity;
   sending an indication of the further call attempt to the service switching entity; and
   sending the stored call information related to the first call attempt to the service switching entity.

12. The method of claim 11, further comprising:
providing the calling entity with an option to initiate the further call attempt when the called entity becomes available,
receiving a response from the calling entity to the option.

13. A method for controlling a set-up of a call from a calling entity to a called entity in a telecommunications network, the call comprising a first call attempt and a further call attempt, the telecommunications network comprising a service control entity, a service switching entity, a subscriber database and a switching node, wherein the subscriber database performs the steps of:
receiving from the service control entity an instruction to initiate storing call information related to the first call attempt;
storing the call information related to the first call attempt;
receiving an indication that the called entity is available;
sending the indication that the called entity is available to the switching node; and
sending to the service control entity the stored call information related to the first call attempt.

14. A service control entity operative in a telecommunications network processing a set-up of a call from a calling entity to a called entity, the call comprising a first call attempt and a further call attempt, the telecommunications network further comprising a service switching entity, the service control entity comprising:
a receiving unit operative to receive from the service switching entity an indication that the first call attempt failed, and further operative to receive from the service switching entity an indication of the further call attempt;
a processing unit operative to obtain call information related to the first call attempt, and further operative to determine a call establishment procedure for the further call attempt based on the call information related to the first call attempt; and
a transmitting unit operative to send an instruction to the service switching entity to continue the set-up of the further call attempt according to the call establishment procedure.

15. A service switching entity operative in a telecommunications network processing a set-up of a call from a calling entity to a called entity, the call comprising a first call attempt and a further call attempt, the telecommunications network further comprising a service control entity and a switching node, the service switching entity comprising:
a receiving unit operative to receive switching node an indication that the first call attempt failed, and further operative to receive from the switching node an indication of the further call attempt, and further operative to receive an instruction from the service control entity to continue the set-up of the further call attempt;
a processing unit operative to establish the further call attempt according to the instruction received from the service control entity; and
a transmitting unit operative to send the indication that the first call attempt failed to the service control entity; and further operative to send the indication of the further call attempt to the service control entity.

16. A switching node operative in a telecommunications network processing a set-up of a call from a calling entity to a called entity, the call comprising a first call attempt and a further call attempt, the telecommunications network further comprising a service control entity, a service switching entity, and a subscriber database, the switching node comprising:
a receiving unit operative to receive from the service switching entity an instruction to initiate storing call information related to the first call attempt, and further operative to receive from the subscriber database an indication that the called entity is available, and further operative to receive from the subscriber database stored call information related to the first call attempt;
a processing unit operative to initiate a further call attempt from the calling entity to the called entity; and
a transmitting unit operative to send an indication that the first call attempt failed to the service switching entity, and further operative to send to the subscriber database the instruction to initiate storing the call information related to the first call attempt, and further operative to send an indication of the further call attempt to the service switching entity, and further operative to send the stored call information related to the first call attempt to the service switching entity.

17. A subscriber database in a telecommunications network processing a set-up of a call from a calling entity to a called entity, the call comprising a first call attempt and a further call attempt, the telecommunications network further comprising a service control entity, a service switching entity, and a switching node, the subscriber database comprising:
a receiving unit operative to receive from the service control entity an instruction to initiate storing call information related to the first call attempt, and further operative to receive an indication that the called entity is available;
a storage unit operative to store the call information related to the first call attempt; and
a transmitting unit operative to send the indication that the called entity is available to the switching node, and further operative to send to the service control entity the stored call information related to the first call attempt.

18. A non-transitory machine readable medium including computer program instructions, which when executed by a processing unit of a service control entity of a telecommunications network processing a set-up of a call from a calling entity to a called entity, the call comprising a first call attempt and a further call attempt, the telecommunications network further comprising a service switching entity, are operative to cause the service control entity to perform the steps of:
receiving from the service switching entity an indication that the first call attempt failed;
receiving from the service switching entity an indication of the further call attempt;
obtaining call information related to the first call attempt;
determining a call establishment procedure for the further call attempt based on the call information related to the first call attempt; and
sending an instruction to the service switching entity to continue the set-up of the further call attempt according to the call establishment procedure.

19. A non-transitory machine readable medium including computer program instructions, which when executed by a processing unit of a service switching entity of a telecommunications network processing a set-up of a call from a calling entity to a called entity, the call comprising a first call attempt and a further call attempt, the telecommunications network further comprising a service control entity and a switching node, are operative to cause the service switching entity to perform the steps of:
receiving from the switching node an indication that the first call attempt failed;
sending the indication that the first call attempt failed to the service control entity;
receiving from the switching node an indication of the further call attempt;

sending the indication of the further call attempt to the service control entity;

receiving an instruction from the service control entity to continue the set-up of the further call attempt, and establishing the further call attempt according to the instruction.

20. A non-transitory machine readable medium including computer program instructions, which when executed by a processing unit of a switching node of a telecommunications network processing a set-up of a call from a calling entity to a called entity, the call comprising a first call attempt and a further call attempt, the telecommunications network further comprising a service control entity, a service switching entity, and a subscriber database, are operative to cause the switching node to perform the steps of:

sending an indication that the first call attempt failed to the service switching entity;

receiving from the service switching entity an instruction to initiate storing call information related to the first call attempt;

sending to the subscriber database the instruction to initiate storing the call information related to the first call attempt;

receiving from the subscriber database an indication that the called entity is available;

receiving from the subscriber database the stored call information related to the first call attempt;

initiating a further call attempt from the calling entity to the called entity;

sending an indication of the further call attempt to the service switching entity; and sending the stored call information related to the first call attempt to the service switching entity.

21. A non-transitory machine readable medium including computer program instructions, which when executed by a processing unit of a subscriber database of a telecommunications network processing a set-up of a call from a calling entity to a called entity, the call comprising a first call attempt and a further call attempt, the telecommunications network further comprising a service control entity, a service switching entity, and a switching node, are operative to cause the subscriber database to perform the steps of:

receiving from the service control entity an instruction to initiate storing call information related to the first call attempt;

storing the call information related to the first call attempt;

receiving an indication that the called entity is available;

sending the indication that the called entity is available to the switching node; and sending to the service control entity the stored call information related to the first call attempt.

* * * * *